Figure 2:
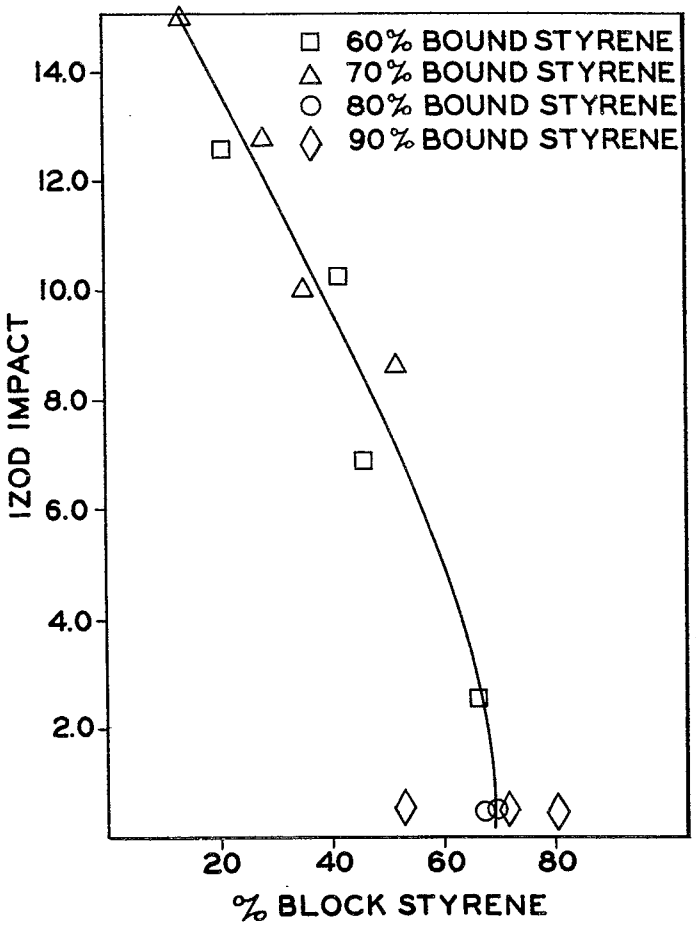
Figure 1:
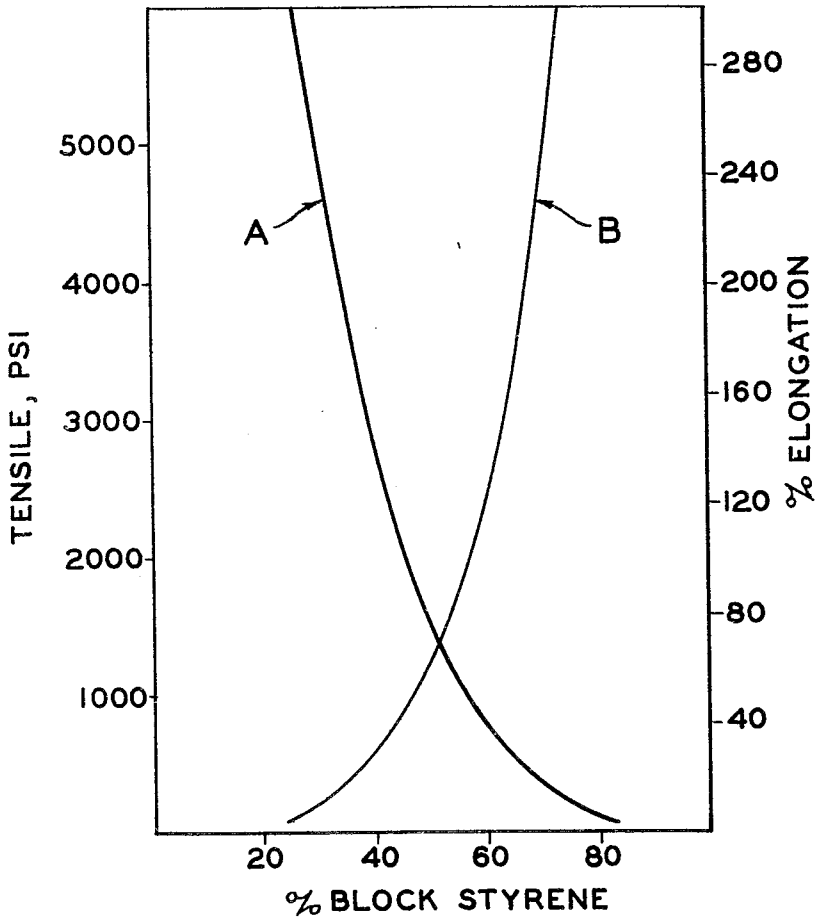

United States Defensive Publication [19] (H) [11] T954,012

Smith [43] Jan. 4, 1977

[54] TRANSPARENT IMPACT POLYSTYRENE PLASTICS

[75] Inventor: Robert C. Smith, Warren, Ohio

[73] Assignee: The Firestone Tire and Rubber Company, Akron, Ohio

[21] Appl. No.: 630,060

[22] Filed: Nov. 7, 1975

Related U.S. Application Data

[63] Continuation of Ser. No. 431,532, Jan. 7, 1974, abandoned, which is a continuation of Ser. No. 237,591, March 15, 1972, abandoned.

[51] Int. Cl.[2] ..... C08F 236/10

[52] U.S. Cl. ..... 526/340

[57] ABSTRACT

Butadiene and styrene (and like monomers) are copolymerized with modifiers to produce linear, randomized copolymers with a block styrene content of about 40 to 80 weight per cent and a bound styrene content of about 70 to 95 per cent. They are sufficiently free of block butadiene to be transparent. Such copolymers are plastic rather than elastomeric, and have high elongations as compared with those usually associated with copolymers of such high styrene content. Also, they have very high impact resistance.

9 Claims, 1 Sheet Drawing,

12 Pages Specification

The file of this unexamined application may be inspected and copies thereof may be purchased (849 O.G. 1221, Apr. 9, 1968).